United States Patent [19]
Hull

[11] 3,799,693
[45] Mar. 26, 1974

[54] BULLET NOSE FASTENING ARRANGEMENT
[75] Inventor: Peter Richard Hull, Ipswich, Mass.
[73] Assignee: General Electric Company, New York, N.Y.
[22] Filed: Nov. 6, 1972
[21] Appl. No.: 304,082

[52] U.S. Cl. ....... 415/121 R, 244/53 B, 415/219 R, 415/201
[51] Int. Cl. .................... F01d 25/24, B64b 1/24
[58] Field of Search ............ 415/121 R, 219 R, 201; 137/15.1; 244/53 B

[56] References Cited
UNITED STATES PATENTS
1,807,397  5/1931  Fechheimer ................. 415/219 R
2,544,490  3/1951  Curley ......................... 415/219 R
2,548,858  4/1951  Benedict ...................... 415/219 R Primary Examiner—Henry F. Raduazo

[57] ABSTRACT

An arrangement for detachably fastening a bullet nose to the forward end of an aircraft engine is provided in a manner which positively precludes the possibility of one of the bullet nose fastening bolts from loosening and entering the engine inlet airstream.

5 Claims, 3 Drawing Figures

PATENTED MAR 26 1974 3,799,693
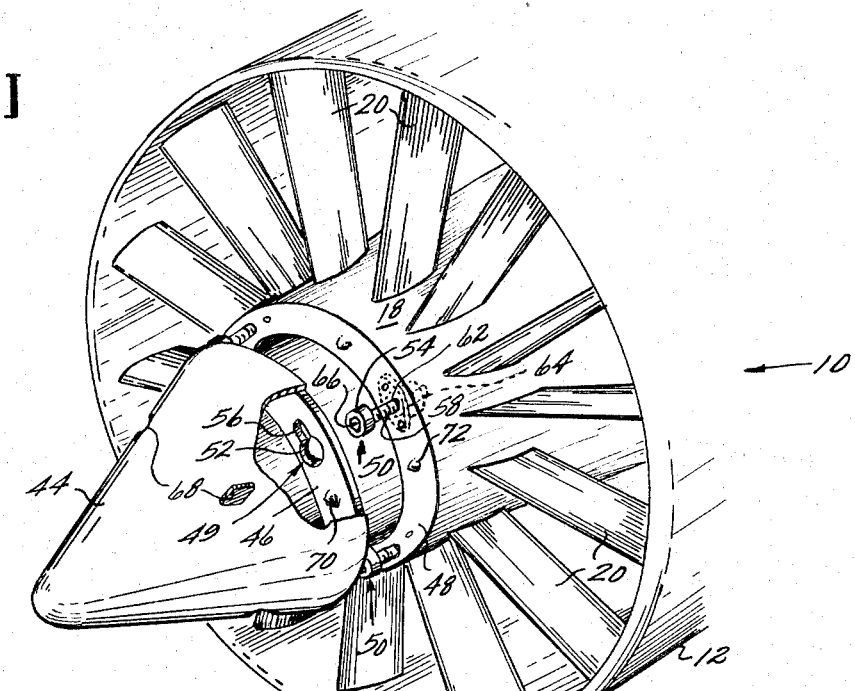

BULLET NOSE FASTENING ARRANGEMENT

BACKGROUND OF THE INVENTION

The invention herein described was made in the course of or under a contract or subcontract thereunder (or grant) with the Department of the Air Force.

In general, this invention relates to a bullet nose fastening arrangement and, more particularly, to a readily detachable fastening arrangement for a bullet nose as commonly included on the forward portion of an aircraft engine.

In order to provide for a smooth and uniform aerodynamic flow around or through an aircraft engine, it is often necessary that the forward portion of the engine core be streamlined so as to generally approach the shape of a bullet. The bullet shaped forward portion is generally called a bullet nose and is preferably made detachable from the remaining core portion in order to provide easy access to bearings, and other like structure, which may be housed therein, and which require periodic maintenance or repair. Bullet nose spinners have been long known to the aircraft engine art and where originally used around the propeller hubs of piston type engines. More recently, bullet noses have been utilized with gas turbine engines in order to streamline the forward portion of a fan or compressor core.

It has been long recognized that bullet noses must be made detachable from the forward end of the aircraft engine in order to facilitate easy maintenance of the structure and hardware contained therein. It is this requirement which has caused engine designers the most difficulty because in order to fasten a bullet nose in a manner which makes it readily detachable from the forward end of the engine, it has heretofore been necessary to include at least one fastening bolt on the outside of the bullet nose. Such a fastening bolt, however, may be subject to loosening or failure through engine vibration or otherwise, in which case should the bolt completely detach or fracture, there is a high likelihood in the case of a gas turbine engine, that the bolt will be sucked through the compressor causing serious damage to the blades of the compressor. Even in the case of propeller type engines, there is the same risk that a loosened bolt will damage the blades of a propeller.

Therefore, it is a primary object of this invention to provide a simple means for fastening a bullet nose to an engine core wherein the bullet nose may be easily removed from the forward end of the engine core and the risk of retaining bolts loosening and entering the airstream is entirely eliminated.

Another object of this invention is to provide a fastening arrangement for a bullet nose wherein all retaining bolts are maintained inside the bullet nose in order to constrain loosened bolts and positively prohibit their entry into the airstream.

SUMMARY OF THE INVENTION

Means for fastening a bullet nose to an engine inlet core include a plurality of retaining bolts. Each bolt includes a threaded portion and a head portion of larger diameter than the threaded portion. The head portion of each bolt also includes a socket recessed therein for receipt of a tightening tool. Means are circumferentially spaced around the hub for threadably engaging the retaining bolts. The bullet nose includes a peripheral flange extending inwardly from the edge thereof, and the flange includes a plurality of circumferentially spaced apart keyhole slots therethrough. The keyhole slots are arranged in substantial coaxial alignment with the bolt engaging means. The bullet nose also includes a plurality of circumferentially spaced openings therethrough in substantial coaxial alignment with the keyhole slots and the bolt engaging means. Each hole through the bullet nose is sized to preclude the passage of a retaining bolt therethrough while permitting intrusion of the tightening tool.

BRIEF DESCRIPTION OF THE DRAWINGS

While the specification concludes with claims particularly pointing out and distinctly claiming the invention, it is more readily understandable by reference to the text below and the accompanying drawings in which:

FIG. 1 is a partial perspective view of the forward portion of a typical gas turbine engine embodying the fastening arrangement of this invention.

FIG. 2 is a partial cross-sectional view of the gas turbine engine of FIG. 1 embodying the fastening arrangement of this invention.

FIG. 3 is an enlarged partial cross-sectional view taken along the line 3—3 of FIG. 2.

DESCRIPTION OF THE PREFERRED EMBODIMENT

Referring to FIGS. 1 and 2, there is shown the inlet portion of a typical gas turbine engine 10 which may be either a straight turbojet or a turbofan. The gas turbine engine 10 is illustrated as comprising an outer casing or nacelle 12 which encloses in conventional flow series; a compressor section, a combustor and a turbine section drivably connected to the compressor section, all of which are not shown in the drawings. The turbine section is drivably connected to the compressor section by means of a rotatable shaft, the forward portion of which is shown at 14. It is to be understood that the fastening means of this invention could also be used with a piston type engine where a bullet nose spinner is provided to cover a propeller hub.

An annular inlet passage 16 is formed between the nacelle 12 and an inner core defined by the fairing 18. A plurality of circumferentially spaced apart inlet guide vanes 20 extend radially outward from the inner fairing 18 to the nacelle 12. Although the inlet guide vanes have been shown as fixedly connected between the fairing 18 and nacelle 12, it is to be understood that variable inlet guide vanes of the type well known to the art could also be utilized.

Referring now particularly to FIG. 2, shaft 14 is shown as journalled for rotaion with respect to the fairing 18 by means of the bearing assembly 22 which comprises an inside annular ring 24, together with a plurality of rolling elements 26 disposed circumferentially about the inner bearing ring and radially retained relative to the inner bearing ring by means of an outer annular bearing ring 28.

Slightly aft of the bearing assembly 22, there is shown a conventional rotating seal 30 of the labyrinth type, comprising a stator element 32 in rotational engagement with a rotor element 34 which circumscribes the shaft 14. Rotor seal element 34 is maintained at the forward end of the shaft 14 by engagement against an integral shoulder 36 around the shaft. The inside annular ring 24 abuts against the forward edge of rotor seal element 34, and is maintained in affixed relation to the rotor shaft 14 for rotation therewith by means of a retaining nut 38 which threadably engages the forward end of shaft 14. A cage 40 may be provided to maintain circumferential spacing between the rolling elements 26 in a manner well known to the art. The bearing elements may be lubricated by conventional means, not shown, wherein the lubricant is confined to the area of the bearing by means of a sump cover 42. The structure so far described is conventional and well known to the gas turbine art.

In order to provide for a smooth and uniform aerodynamic flow into the annular inlet 16, it is necessary that the forward portion of the airing 18 be streamlined so as to generally approximate the shape of a bullet nose as may be best seen in FIG. 1. In order to provide access to the bearing assembly 22 for maintenance or repair, it is necessary that the forward streamlined portion of fairing 18 be made detachable. To this end, a detachable bullet nose 44 is provided for quick assembly or disassembly to the fairing 18 by means now to be described.

Bullet nose 44 is provided with an inwardly directed peripheral flange 46 which may be formed integral to bullet nose 44, or attached thereto by conventional means such as rivets. The forward edge of fairing 18 also includes an inwardly directed peripheral flange 48 for enagement with flange 46 of the bullet nose. Peripheral flange 46 includes a plurality of circumferentially spaced apart keyhole slots 49, best shown in FIGS. 1 and 3, wherein the keyhole slots are critically sized to receive retaining bolts 50. The portion 52 of greatest diameter of the keyhole slot 49 is sized so that head portion 54 of retaining bolt 50 will pass freely therethrough while the narrow portion 56 of the keyhole slot is sized so that only the threaded portion 58 of retaining bolt 50 will pass freely therethrough. Peripheral flange 48 includes a plurality of circumferentially spaced apart retainer bolt receiving holes 62 which are sized so as to receive the threaded portions 58 of bolts 50. Adjacent the receiving holes 62 there are provided flanged nuts 64 in attachment to the peripheral flange 48 for threadably engaging the retainer bolts 50. The flanged nuts 64 may be riveted or welded to the peripheral flange 48, or alternatively the retainer bolt receiving holes 62 could be internally threaded so as to engage the retainer bolts 50 thereby dispensing altogether with the flanged nuts 64.

A socket 66 is recessed in the head of each retainer bolt 50 so as to receive a tool T, such as an Allen wrench, for tightening or loosening each retaining bolt. A plurality of circumferentially spaced apart holes 68, as best seen in FIG. 1, are provided through the bullet nose 44 in substantial coaxial alignment with the keyhole slots 49. The holes 68 are tailored to permit the entrance of tightening tools such as Allen wrenches but restrict the passage of bolts 50 therethrough. A locating nipple 70 is provided on the peripheral flange 46 for engagement with a locating dimple 72 in the peripheral flange 48.

In order to attach the bullet nose 44 in the fairing 18, the retaining bolts 50 are first inserted through receiving holes 62, whereupon the bolts are then threadably engaged to the flanged nuts 64. The bolts 50 are not fully tightened at this time as is shown in FIG. 1. Bullet nose 44 is then brought up adjacent to fairing 18 with the bolt heads 54 passing through the enlarged portions 52 of the keyhole slots 49. Bullet nose 44 is next rotated in a clockwise direction, as viewed from the engine inlet, whereupon the bolt heads 54 are tightened to engage the peripheral flange 46 in those areas around the portions 56 of the keyhole slots 49. Insertion of nipple 70 within dimple 72 insures full clockwise rotation and prevents rotational slippage between the bullet nose 44 and fairing 18 should the retaining bolts slightly loosen. As now becomes obvious, once the bullet nose has been rotated to the clockwise position, the retaining bolts 50 may be tightened by inserting tool T through the holes 68 into engagement with the bolt head sockets 66.

In order to remove the bullet nose 44, which may be a periodic requirement for maintenance of the bearing assembly 22, the process is reversed with the retaining bolts first loosened by insertion of the aforementioned tool. After loosening the retaining bolts 50, the bullet nose is moved forward a limited distance disengaging the nipple 70 from the dimple 72. The bullet nose is next rotated in a counter clockwise direction such that the wide diameter protions 49 of the keyhole slots 52 align with the heads 54 of retaining bolts 50 permitting removal of the bullet nose 44 from fairing 18.

The above described fastening arrangement finally overcomes a long known problem in the aircraft engine art which was even existent in older piston type engines where bullet nose spinners were generally used to cover propeller hubs. As previously discussed, it has been long recognized that bullet noses must be made detachable from the forward end of the engine in order to facilitate maintenance. It is this requirement which has caused engine designers the most difficulty because in order to fasten a bullet nose in a manner which makes it readily detachable from the forward end of the engine, it has heretofore been necessary to include at least one fastening bolt on the outside of the bullet nose. Such a fastening bolt, however, may be subject to loosening or fracture through engine vibration or otherwise, in which case should the bolt fully detach, there is a high risk that the bolt will cause serious damage to the compressor blades. In the case of a propeller type engine there is the same risk that a loosened bolt will damage the blades of a propeller.

As now becomes obvious, the instant invention overcomes this difficulty by including all retaining bolts within the confines of the bullet nose. Should a bolt loosen through vibration or otherwise, the bolt will remain confined within the bullet nose. Holes 68 through the bullet nose are deliberately made smaller than the retaining bolts to preclude the possibility of bolts passing into the inlet airstream even in the unlikely event that any of the bolts should loosen. The retaining bolt heads must be provided with internal sockets to permit the tightening tool to pass through the holes 68 yet still preclude the possibility of bolts coming out through the same holes.

Therefore, having discribed preferred embodiments of the invention, though not exhaustive of all possible equivalents, what is desired to be secured by Letters Patent is distinctly claimed and particularly pointed out in the claims appearing below.

What is claimed is:

1. Means for fastening a bullet nose to an engine comprising:

a plurality of retaining bolts having a threaded portion and a head portion of larger diameter than the threaded portion with each head portion including a socket recessed therein for receipt of a tightening tool;

means circumferentially spaced around the engine for threadably engaging the retaininng bolts; and a peripheral flange extending inwardly from the edge of the bullet nose and having a plurality of keyhole slots therethrough circumferentially spaced around the flange in substantial coaxial alignment with the bolt engaging means, wherein the bullet nose includes a plurality of circumferentially spaced openings therethrough in substantial coaxial alignment with the keyhole slots and the bolt engaging means and wherein each hole is sized to preclude the passage of a retaining bolt therethrough while permitting intrusion of the tightening tool.

2. The fastening means of claim 1 wherein:

the large diameter portions of the keyhole slots are of sufficient size to permit passage of the head portions of each bolt therethrough and the small diameter portions of the keyhole slots are sized to permit passage of the threaded portions of each bolt therethrough while engaging the head portions of each bolt.

3. In a gas turbine engine, means for fastening a bullet nose to an inner fairing of an aircraft engine comprising:

a plurality of retaining bolts having a threaded portion and a head portion of larger diameter than the threaded portion with each head portion including a socket recessed therein for receipt of a tightening tool;

a first peripheral flange extending inwardly from the edge of the fairing and having means circumferentially spaced around the flange for threadably engaging the retaining bolts; and a second peripheral flange extending inwardly from the edge of the bullet nose and having a plurality of keyhole slots therethrough circumferentially spaced around the second flange in substantial coaxial alignment with the bolt engaging means wherein the bullet nose includes a plurality of circumferentially spaced openings therethrough in substantial coaxial alignment with the keyhole slots and the bolt engaging means, and wherein each hole is sized to preclude the passage of a retaining bolt therethrough while permitting intrusion of a tightening tool.

4. The fastening means of claim 3 wherein the large diameter portions of the keyhole slots are of sufficient size to permit passage of the head portions of each bolt therethrough and the small diameter portions of the keyhole slots are sized to permit passage of the threaded portions of each bolt therethrough while engaging the head portions of each bolt.

5. The fastening means of claim 4 wherein the bolt engaging means include a plurality of holes through the first peripheral flange, each hole of which is in substantial alignment with a nut attached to the first peripheral flange for threadably engaging a retaining bolt.

* * * * *